United States Patent [19]

Kawazoe

[11] 4,426,144

[45] Jan. 17, 1984

[54] POWER SUPPLY UNIT SHARED BY CAMERA'S MOTOR DRIVE AND ELECTRONIC FLASH

[75] Inventor: Mitsuo Kawazoe, Hachioji, Japan

[73] Assignee: Olympus Optical Co. Ltd., Tokyo, Japan

[21] Appl. No.: 342,992

[22] Filed: Jan. 27, 1982

Related U.S. Application Data

[63] Continuation of Ser. No. 75,223, Sep. 13, 1979, abandoned.

[30] Foreign Application Priority Data

Oct. 25, 1978 [JP] Japan ................................ 53/131426

[51] Int. Cl.³ ..................... G03B 15/03; G03B 1/18
[52] U.S. Cl. ............................. 354/145.1; 354/173.1
[58] Field of Search ..................... 354/145, 173, 213

[56] References Cited

U.S. PATENT DOCUMENTS

| | | | |
|---|---|---|---|
| 3,846,812 | 11/1974 | Biber | 354/145 |
| 3,903,466 | 9/1975 | Kondo | 354/213 |
| 4,220,407 | 9/1980 | Stemme et al. | 354/173 |

*Primary Examiner*—Russell E. Adams
*Attorney, Agent, or Firm*—Weinstein & Sutton

[57] ABSTRACT

A power supply unit shared by a camera's motor drive and an electronic flash comprises a timing circuit which becomes operative at the termination of a shutter release operation, or a detector which detects the energization of a motor contained in the motor drive. Either timing circuit or detector operates to feed the motor drive or the electronic flash in alternate fashion in time so as to prevent both the motor drive and the electronic flash from being simultaneously fed from a single common d.c. source.

11 Claims, 9 Drawing Figures

POWER SUPPLY UNIT SHARED BY CAMERA'S MOTOR DRIVE AND ELECTRONIC FLASH

This is a continuation of application Ser. No. 075,223, filed Sept. 13, 1979, now abandoned.

BACKGROUND OF THE INVENTION

The invention relates to a power supply unit shared by a motor drive of a camera and an electronic flash.

When a single power supply is shared by a motor drive of a camera and an electronic flash, a sufficient starting current may not be available for the motor drive when a main capacitor of an electronic flash is being charged from the power supply if the latter has a reduced power capacity, thus resulting in a failure to operate the motor drive.

SUMMARY OF THE INVENTION

It is an object of the invention to eliminate above disadvantage of the prior art by providing a power supply unit shared by a camera's motor drive and an electronic flash which responds to a signal indicative of a shutter release operation of the camera by interrupting the supply of power to the electronic flash until after the operation of the motor drive.

In accordance with the invention, there is provided a time constant circuit which monitors the time interval during which the motor drive operates. Alternatively, a detector may be provided which detects the energization of the motor drive in order to monitor the operating condition thereof. Either time constant circuit or the detector operates to provide a connection of the electronic flash and the motor drive with the single d.c. power supply in alternate fashion, thus allowing a power supply of a reduced power capacity to be used without accompanying a failure to operate the motor drive.

DESCRIPTION OF PREFERRED EMBODIMENTS

Figure 1:
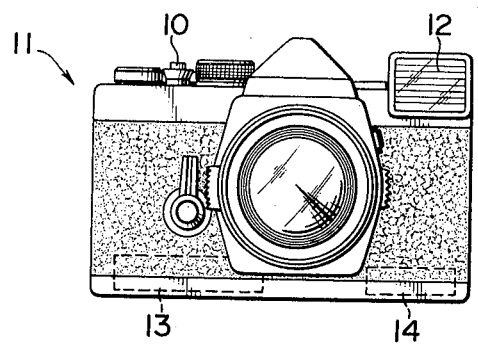
FIG. 1 is a front view of a single lens reflex camera incorporating the power supply unit according to the invention.
Figure 2:
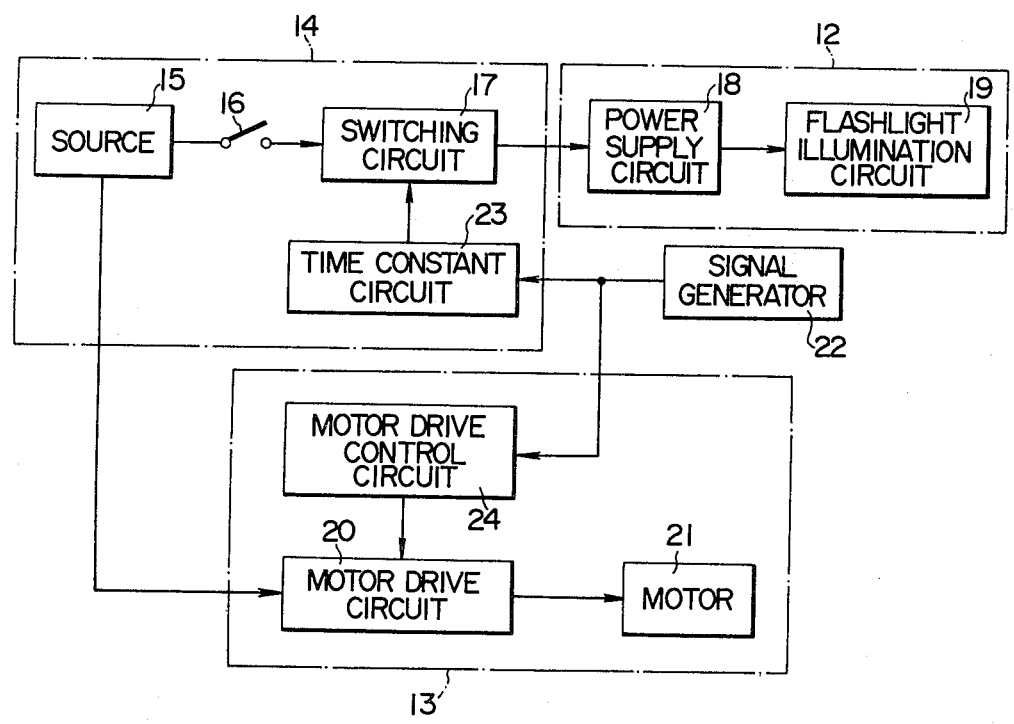
FIG. 2 is a block diagram of the power supply unit according to one embodiment of the invention.

Referring to FIG. 1, there is shown single lens reflex camera 11 which internally houses electronic flash 12 and motor drive 13, both of which are fed from single power supply unit 14. Referring to FIG. 2, power supply unit 14 comprises d.c. source 15 having a relatively low capacity as may be provided by a battery. In addition, the power supply unit 14 comprises switching circuit 17 which is connected with source 15 through switch 16, which is adapted to be closed when a picture is to be taken under flashlight illumination from an electronic flash. Finally, the power supply unit 14 includes time constant circuit 23 which feeds an output signal to switching circuit 17.

In FIG. 2, electronic flash 12 includes power supply circuit 18 to which a control signal from switching circuit 17 is applied at a suitable timing, and also includes flashlight illumination circuit 19 of a known form which is fed with an output voltage from power supply circuit 18. On the other hand, motor drive unit 13 comprises motor 21 which is used to perform an automatic film winding, motor drive circuit 20 which drives motor 21, and motor drive control circuit 24 which controls motor drive circuit 20. It is to be noted that housed within the body of camera 11 is film winding signal generator 22 which produces an output signal at the termination of a shutter release operation, and which applies it to time constant circuit 23 and to motor drive control circuit 24. D.C. source 15 also feeds motor 21 through motor drive circuit 20.

In the circuit arrangement of FIG. 2, power supply unit 14 operates to connect electronic flash 12 and motor drive unit 13 alternately, or offset in time, with source 15 under the control of time constant circuit 23 in order to prevent a failure of proper operation of motor drive unit 13. Specifically, switch 16 is closed in order to take a picture under flashlight illumination and to perform a film winding operation automatically. The closure of switch 16 permits the output voltage of source 15 to be applied to power supply circuit 18 through switch 16. It is assumed that switching circuit 17 is not operative at this time to prevent an operation of power supply circuit 18, which therefore immediately initiates its operation. As is well recognized, power supply circuit 18 includes a voltage step-up circuit as may be formed by a dc-dc converter for converting a low input voltage into a higher voltage. Hence, when power supply circuit 18 is fed with a low voltage from source 15, the step-up circuit operates to produce a high voltage, which charges a main capacitor contained in the electronic flash. On the other hand, the output voltage of source 15 is also supplied to motor 21 through motor drive circuit 20, which however is not activated by motor drive control circuit 24. As a result, motor 21 remains inoperative.

When shutter button 10 (see FIG. 1) of camera 11 is now depressed, the shutter of camera 11 is operated, whereby synchro-contacts are closed. In response thereto, flashlight illumination circuit 19 is activated to produce flashlight illumination from the electronic flash 12. Subsequently, when a photographing operation under flashlight illumination is terminated and a shutter release operation of camera 11 is completed, generator 22 produces a film winding signal, which is applied to time constant circuit 23 and to motor drive control circuit 24. In response to this signal, time constant circuit 23 produces an inhibit signal applied to switching circuit 17 which is effective to inhibit the operation of power supply circuit 18 for a given time interval determined by the time constant thereof. Consequently, a power dissipation in the electronic flash 12 is interrupted.

On the other hand, in response to a film winding signal, motor drive control circuit 24 produces a control signal which is applied to enable motor drive circuit 20, which in turn permits the output voltage from source 15 to be supplied to motor 21 for driving it for rotation. The rotation of motor 21 is effective to drive an automatic film winding mechanism (not shown), thus achieving an automatic film winding operation.

It will be seen that for a given time interval subsequent to the completion of a shutter release operation, the time constant circuit 23 inhibits a power dissipation in the electronic flash, and the power from source 15 is essentially used in driving motor 21 of motor drive unit 13. In this manner, it is assured that motor 21 is sufficiently driven from source 15 to provide an automatic film winding operation in a reliable manner.

The duration of the inhibit signal from time constant circuit 23 is chosen to be equal to a length of time from the occurrence of a film winding signal at the termination of a shutter release operation until an automatic film winding operation is terminated through the drive of motor 21. Hence, when the film winding operation is completed, the inhibit signal which inhibited the operation of switching circuit 17 ceases to be produced. Power supply circuit 18 then reinitiates its operation to supply a high voltage to the electronic flash 12, so that the main capacitor therein is charged again in preparation to providing another flashlight illumination from the electronic flash. In this manner, the electronic flash 12 and motor drive 13 are alternately driven, assuring a reliable operation of the respective units.

Figure 3:
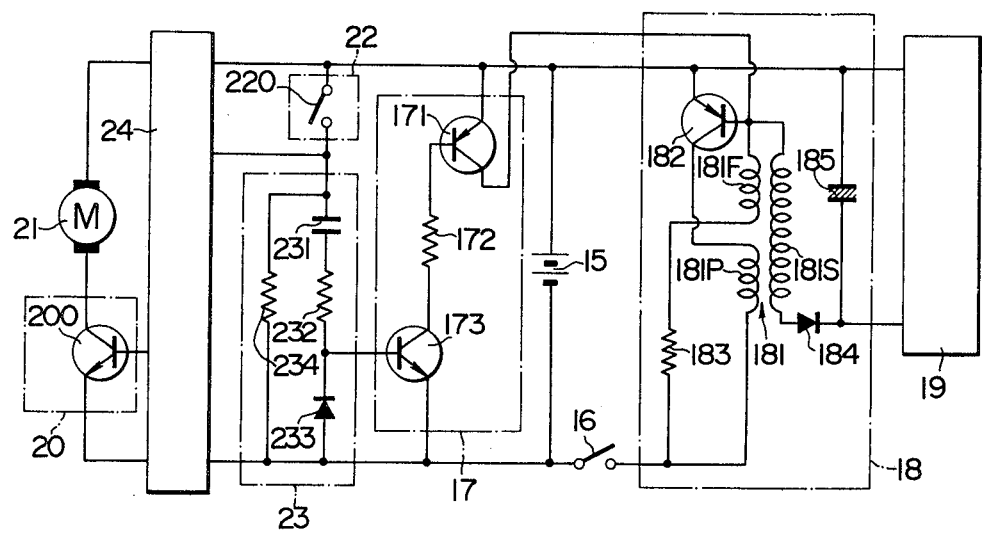
FIGS. 3 and 4 are circuit diagrams illustrating specific circuit arrangements of the electrical circuit shown in block form in FIG. 2.

FIG. 3 shows a specific circuit arrangement which corresponds to that shown in block form in FIG. 2. In FIG. 3, d.c. source 15 is shown as a battery having its negative terminal connected with one end of switch 16. Power supply circuit 18 of the electronic flash is connected across the positive terminal of battery 15 and the other end of switch 16. As mentioned previously, power supply circuit 18 comprises a dc-dc converter including step-up oscillator transformer 181 having primary winding 181P, secondary winding 181S and feedback winding 181F, and oscillator transistor 182 having its collector connected with one end of primary winding 181P, its base connected with the junction between feedback winding 181F and secondary winding 181S and its emitter connected with the positive terminal of battery 15. Resistor 183 is connected across the other end of feedback winding 181F and the other end of switch 16. Diode 184 has its anode connected with the other end of secondary winding 181S and its cathode connected with the positive terminal of battery 15 through main capacitor 185. It will be seen that the other end of primary winding 181P is connected with the other end of switch 16. Flashlight illumination circuit 19 of a known form is connected across main capacitor 185.

Switching circuit 17 is connected in shunt with battery 15, and includes transistor 171 which has its emitter connected with the positive terminal of battery 15, its collector connected with the base of transistor 182 and its base connected through resistor 172 with the collector of another transistor 173 having its emitter connected with battery 15.

A series combination of film winding signal generator 22 and time constant circuit 23 is connected across battery 15. Generator 22 comprises switch 220 which is closed at the termination of a shutter release operation. One end of switch 220 is connected with positive terminal of battery 15 while its other end is connected with one end of a series circuit including timing capacitor 231, timing resistor 232 and diode 233. The other end of the series circuit is connected with the negative terminal of battery 15. The series circuit is shunted by resistor 234. Diode 233 has its anode connected with the negative terminal of battery 15 and its cathode connected with resistor 232, with the junction therebetween connected with the base of transistor 173.

Motor drive control circuit 24 is also connected across battery 15, and receives a signal developed at the junction between switch 220 and capacitor 231. A series combination of motor drive circuit 20 and motor 21 is connected with control circuit 24. Motor drive circuit 20 comprises transistor 200 having its collector connected with one end of the motor and having its base and emitter connected with control circuit 24 so as to be controlled thereby. The other end of motor 21 is also connected with control circuit 24.

In operation, before the shutter is released, switch 220 is open, and hence transistor 173 remains off as does transistor 171. Hence, no inhibit signal is produced by switching circuit 17 to prevent an operation of the power supply circuit 18. When switch 16 is closed to take a picture under flashlight illumination from the electronic flash under this condition, the voltage from source 15 is applied through switch 16 across power supply circuit 18, which then initiates its operation, developing a high voltage across secondary winding 181S. This high voltage is rectified by diode 184 to charge main capacitor 185. Since switch 220 is not closed at this time, motor 21 of the motor drive 13 remains inoperative.

When the shutter of camera 11 is released, flashlight illumination circuit 19 produces a flashlight illumination by discharging main capacitor 185 in response to the closure of synchro-contacts. At the termination of the shutter release operation, switch 220 is closed. Thereupon, the voltage of battery 15 is applied across the series combination of timing capacitor 231 and resistor 232, thus charging capacitor 231. The charging current flows through switch 220, capacitor 231, resistor 232 and the base-emitter path of transistor 173, thus maintaining the latter on until capacitor 231 is fully charged. The duration of the time during which transistor 173 remains on is determined by a time constant defined by capacitor 231 and resistor 232. The conduction of transistor 173 turns transistor 171 on, which then produces an inhibit signal in that the collector-emitter path of transistor 171 short-circuits the base-emitter path of oscillator transistor 182 contained in power supply circuit 18, thus disabling its operation.

When switch 220 is closed, the film winding signal produced thereby is applied to motor drive control circuit 24, thus activating it. Control circuit 24 then produces an output signal to render transistor 200 conductive, whereupon motor 21 is energized for rotation, performing an automatic film winding operation.

When an automatic film winding operation by the motor drive 13 is completed, transistor 173 contained in switching circuit 17 is turned off since the time constant defined by capacitor 231 and resistor 232 is chosen substantially equal to a length of time required for an automatic film winding operation to be completed. Transistor 171 is then also turned off, removing the inhibit signal. As a consequence, power supply circuit 18 is enabled again, charging main capacitor 185 again.

In this manner, power supply circuit 18 which constitutes the electronic flash 12 and motor 21 which constitutes the motor drive 13 are alternately driven from common d.c. source 15 under the control of time constant circuit 23 and switching circuit 17, thus preventing any likelihood that motor drive 13 may fail to operate properly.

Figure 4:
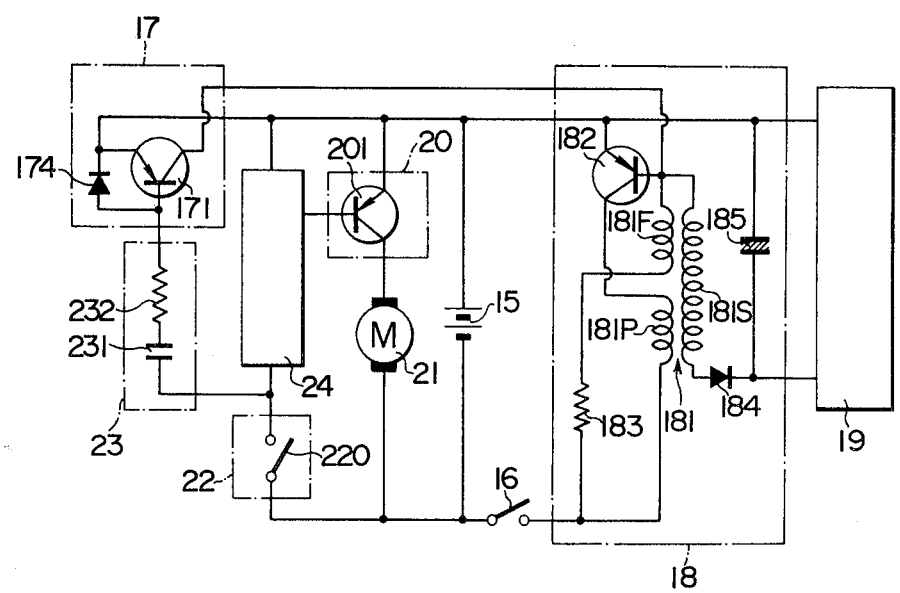

FIG. 4 shows another circuit arrangement corresponding to the block diagram shown in FIG. 2. In FIG. 4, the circuit arrangement and the electrical interconnection of battery 15, switch 16, power supply circuit 18 and flashlight illumination circuit 19 are similar to those shown in connection with FIG. 3, and therefore will not be described.

In FIG. 4, a series combination of motor drive circuit 20 and motor 21 is connected across battery 15. Motor drive circuit 20 comprises transistor 201 having its emitter connected with the positive terminal of battery 15 and its collector connected with one end of motor 21, the other end of which is connected with the negative terminal of battery 15. The base of transistor 201 is connected with motor drive control circuit 24 which is connected across battery 15 in series with switch 220 which forms the film winding signal generator 22. The junction between switch 220 and control circuit 24 is connected with one end of time constant circuit 23 formed by a series combination of timing capacitor 231 and resistor 232. The other end of time constant circuit 23 is connected with switching circuit 17 which comprises transistor 171. Diode 174 has its anode connected with the base and its cathode connected with the emitter of transistor 171. The emitter of transistor 171 is connected with the positive terminal of battery 15 while its collector is connected with the base of oscillator transistor 182 contained in power supply circuit 18.

The operation of the circuit arrangement shown in FIG. 4 before the shutter is released to close switch 16 is similar to that described above in connection with FIG. 3. Upon termination of a shutter release operation, switch 220 is closed, producing a film winding signal. Then the series circuit of capacitor 231 and resistor 232 is fed from battery 15, thus charging capacitor 231. The charging current flows from the positive terminal of battery 15 through the emitter-base path of transistor 171, rendering it conductive until capacitor 231 is charged. This transistor 171 disables or inhibits the operation of power supply circuit 18.

The film winding signal produced by switch 220 is applied to control circuit 24, which then turns transistor 201 on, allowing motor 21 to be energized for rotation, thus allowing an automatic film winding operation to be performed.

When an automatic film winding operation by the motor drive 13 is completed, transistor 171 is switched off, terminating the inhibit signal applied to power supply circuit 18 since the time constant of circuit 23 is chosen to be substantially equal to a length of time required for the automatic film winding operation to be completed. Consequently, power supply circuit 18 is enabled again to reinitiate the charging of main capacitor 185. Thus, the general operation is similar to that of the circuit arrangement shown in FIG. 3.

Figure 5:
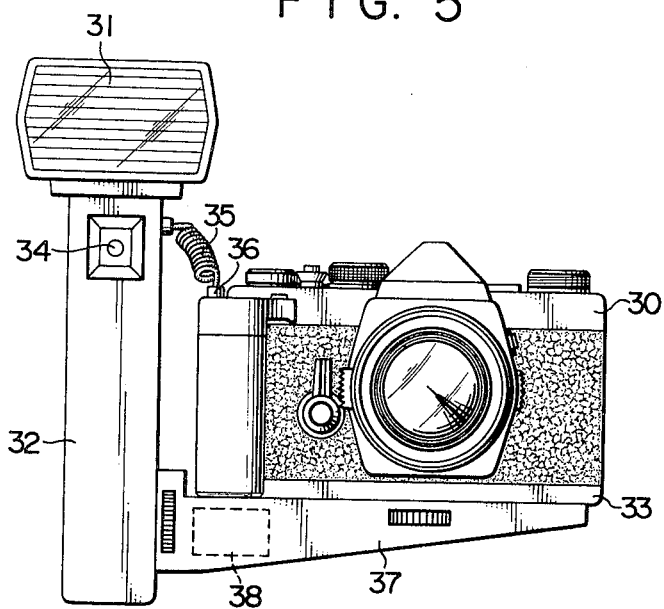
FIG. 5 is a front view of a single lens reflex camera in which are assembled an electronic flash and a motor drive, both fed from a single power supply unit.

While camera 11 shown in FIG. 1 internally houses both electronic flash 12 and motor drive 13, FIG. 5 shows a different camera 30 which is associated with motor drive 33 and electronic flash 31, both of which are detachably mounted on the camera. As shown, motor drive 33 has an L-shaped structure so as to be integrally mounted along the bottom and the left-hand sidewall of camera 30. Bracket 37 is integrally connected with the underside of motor drive 33, and is integrally provided with grip 32 on its left-hand end which is associated with electronic flash 31. Trigger button 34 is disposed on an upper portion of grip 32 for triggering motor drive 33 which is mounted on camera 30. The trigger button 34 operates a switch, not shown, which is connected through cord 35 with remote control terminal 36 of motor drive 33. It should be understood that drive control circuit 38 which controls the motor drive 33 is contained within bracket 37. Control circuit 38 may comprise motor drive control circuit 24 and motor drive circuit 20 shown in FIG. 2. Drive control circuit 38 is connected with the motor drive 33 through a connection terminal located within bracket 37 and a corresponding terminal provided on the part of the motor drive 33.

In FIG. 5, it should be understood that electronic flash 31 contains a d.c. source, a switch which is closed when the electronic flash is to be used, a switching circuit, a power supply circuit associated with the electronic flash, a flashlight illumination circuit and a time constant circuit such as those shown at 15, 16, 17, 18, 19 and 23 in FIG. 2, for example. On the other hand, motor 21 and film winding signal generator 22 are contained within motor drive 33 and the body of camera 30, respectively.

When electronic flash 31 and motor drive 33 are mounted on camera 30, the depression of trigger button 34 which is located on electronic flash 31 activates the motor drive 33, initiating a shutter release operation and an automatic film winding operation. A film winding signal is produced at the termination of the shutter release operation, and activates a time constant circuit as shown at 23 in FIG. 2, which is effective to interrupt a current flow to the power supply circuit of the electronic flash during a film winding operation, thus assuring a reliable operation of the motor drive 33.

Figure 6:
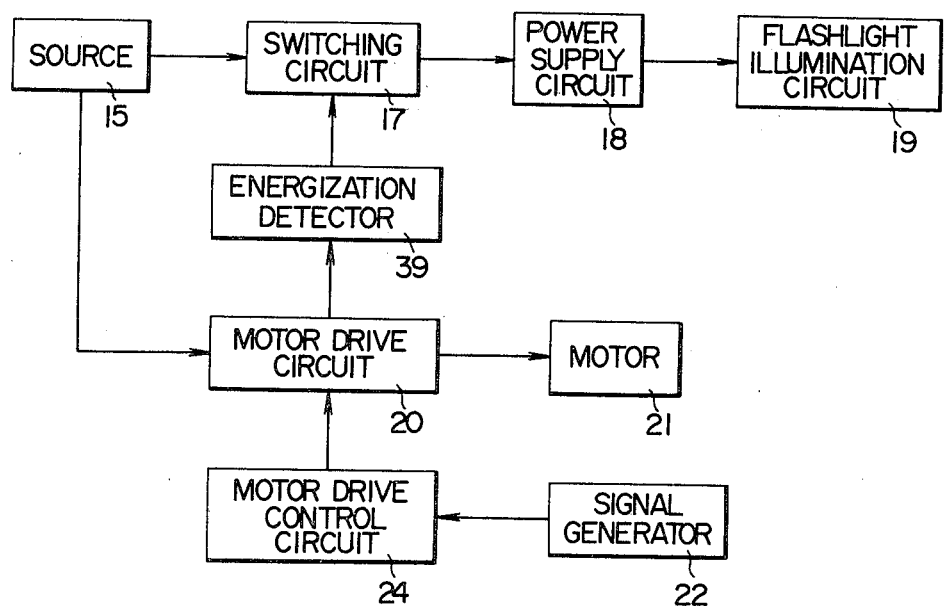
FIGS. 6 and 7 are block diagrams of other embodiments of the shared power supply unit.
Figure 7:
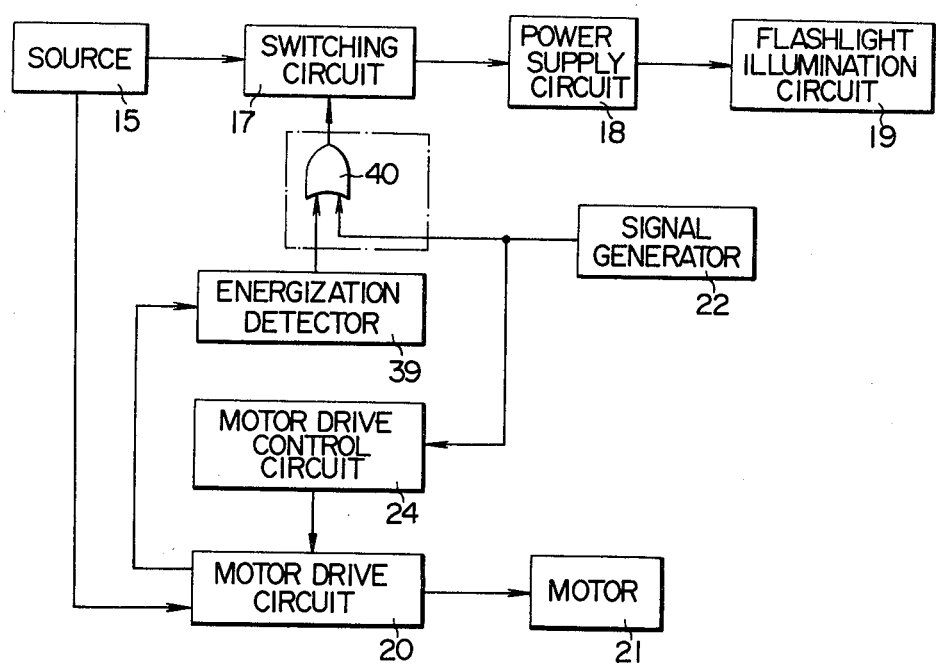

FIGS. 6 and 7 are block diagrams of circuit arrangements according to other embodiments of the invention. The block diagrams are similar to each other except the provision of OR circuit 40 shown in a phantom line in FIG. 7, and hence corresponding parts are designated by like reference numerals in both Figures, which are again similar to corresponding parts shown in FIG. 2.

In FIGS. 6 and 7, the output voltage of battery 15 is supplied to power supply circuit 18 associated with the electronic flash and to motor 21 through switching circuit 17 and motor drive circuit 20, respectively. The output voltage of power supply circuit 18 is fed to flashlight illumination circuit 19. A film winding signal which is produced by generator 22 is applied to activate motor drive control circuit 24, which then drives motor drive circuit 20 to energize motor 20 for rotation. Motor drive circuit 20 is also connected with energization detector 39, which is operable to detect if motor 21 is energized and hence is in operation.

The above description equally applies to both circuit arrangements shown in FIGS. 6 and 7. The remaining arrangement which differs between FIGS. 6 and 7 will be described below. In FIG. 6, an output signal from detector 39 is directly applied to switching circuit 17 while in FIG. 7, an output signal from detector 39 is applied to one input of OR circuit 40 so as to be applied thence to switching circuit 17. The other input of OR circuit 40 receives a film winding signal produced by generator 22, and thus the film winding signal is also applied to switching circuit 17 to activate it.

In FIGS. 6 and 7, when an automatic film winding operation by the motor drive is completed and motor 20 is no longer energized, detector 39 detects that motor 21 is not in operation. Under this condition, detector 39 ceases to produce its output signal. Generator 22 does not produce a film winding signal. As a consequence, in the arrangement of FIG. 6, siwtching circuit 17 is not activated. Also, in FIG. 7, OR circuit 40 receives no output signal from either circuit 39 or 22, and hence switching circuit 17 is not activated. Because switching circuit 17 does not produce an inhibit signal, power supply circuit 18 is not prevented from operating. Thus it is fed from source 15 to produce a high voltage which charges a main capacitor contained in the electronic flash.

Subsequently when the shutter of the camera is released and the release operation is terminated, generator 22 produces a film winding signal, which is applied to control circuit 24 in FIG. 6 and is applied to OR circuit 40 and control circuit 24 in FIG. 7. In FIG. 7, the film winding signal applied to OR circuit 40 directly activates switching circuit 17, which then inhibits the operation of power supply circuit 18.

On the other hand, the film winding signal applied to motor drive control circuit 24 in both FIGS. 6 and 7 activates it. Control circuit 24 produces an output signal which enables motor drive circuit 20 to energize motor 21 for rotation. The rotation of motor 21 is transmitted to an automatic film winding mechanism (not shown), thus performing an automatic film winding operation. When motor drive circuit 20 is driven, detector 39 detects such condition, producing an energization detected signal.

The energization detected signal is directly applied to switching circuit 17 in FIG. 6, but is applied thereto through OR circuit 40 in FIG. 7. In response to the energization detected signal, switching circuit 17 is activated. (In the arrangement of FIG. 7, switching circuit 17 continues to be activated). Switching circuit 17 produces an inhibit signal which immediately inhibits the operation of power supply circuit 18. (In FIG. 7, the operation of power supply circuit 18 continues to be inhibited.) In FIG. 7, if a film winding signal is produced once, its termination does not interrupt the activation of switching circuit 17, which remains to be activated by detector 39 so long as the motor is being driven.

In FIG. 7, the film winding signal produced by generator 22 is applied through OR circuit 40 to switching circuit 17 in order to activate the latter immediately in order to prevent an insufficient amount of starting current from being applied to motor 21 as a result of the power supply circuit 18 being fed simultaneously during a time interval from the activation of control circuit 24 and drive circuit 20 to drive the motor 21 until the rotation of motor 21 is detected by detector 39 to activate switching circuit 17.

Upon termination of an automatic film winding operation by the motor drive, both motor drive control circuit 24 and motor drive circuit 20 return to their inoperative conditions, thus stopping motor 21. Energization detector 39 detects such condition of the motor and ceases to produce its output signal. As a consequence, a corresponding output is applied to switching circuit 17 directly in the arrangement of FIG. 6 or through OR circuit 40 in the arrangement of FIG. 7, rendering switching circuit 17 inoperative, whereby power supply circuit 18 of the electronic flash is rendered operative again.

As discussed above, in the arrangements shown in FIGS. 6 and 7, power supply circuit 18 which constitutes the electronic flash and motor 21 which constitutes the motor drive are fed from common d.c. source 15 in alternate fashion under the control of energization detector 39, thus assuring a reliable operation of the motor drive.

Figure 8:
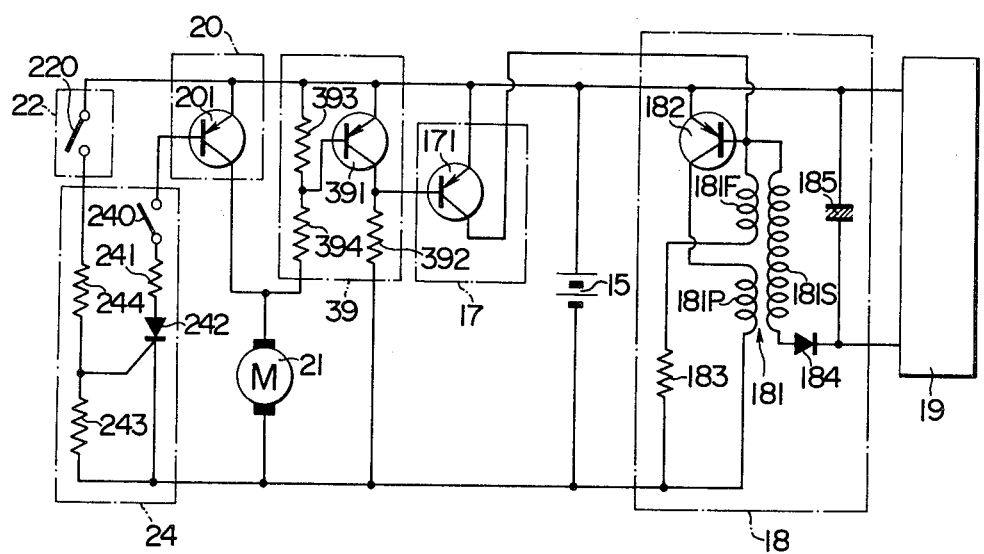
FIGS. 8 and 9 are circuit diagrams illustrating the specific circuit arrangements of the power supply units shown in FIGS. 6 and 7, respectively.
Figure 9:
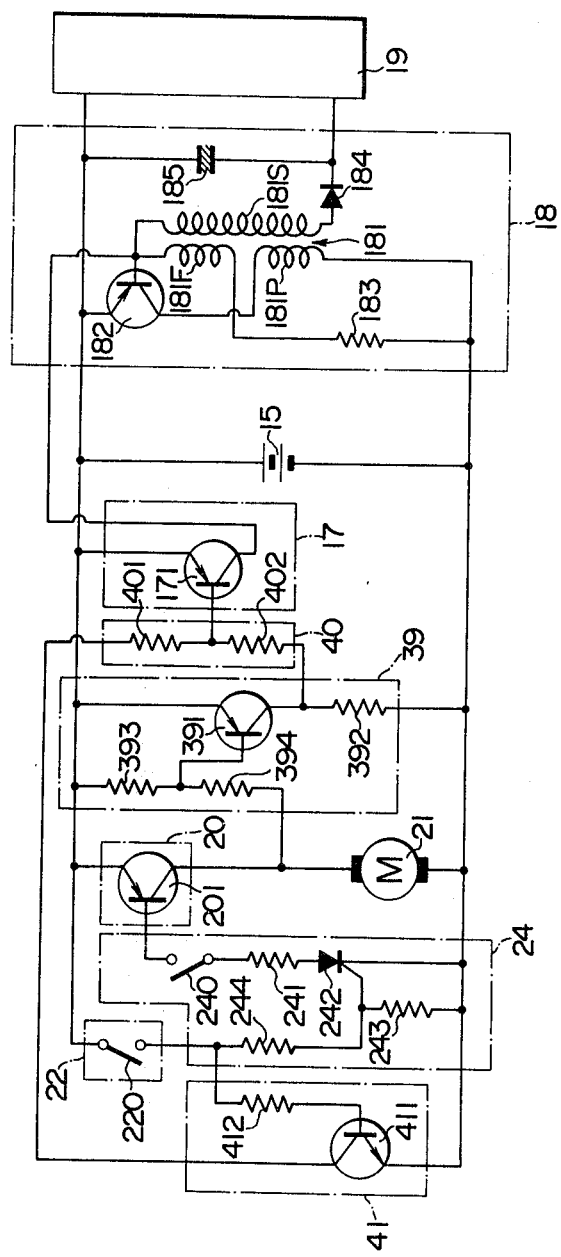

FIGS. 8 and 9 are specific circuit arrangements of the block diagrams shown in FIGS. 6 and 7, respectively. Except for the provision of OR circuit 40 and OR gate drive circuit 41 in the arrangement of FIG. 9, both circuit arrangements are identical with each other.

Similarly, it should be noted that d.c. source 15, power supply circuit 18, flashlight illumination circuit 19, motor drive circuit 20, motor 21 and film winding signal generator 22 are completely the same in arrangement and operation as d.c. source 15, power supply circuit 18, flashlight illumination circuit 19, motor drive circuit 20, motor 21 and film winding signal generator 22 shown in FIGS. 3 and 4 except for the provision of switch 16 which is omitted. Hence, these components and blocks are designated by like reference characters without repeating their description.

In FIGS. 8 and 9, motor energization detector 39 comprises a series circuit of transistor 391 and resistor 392 connected across source 15. Resistor 393 is connected across the base and the emitter of transistor 391, and resistor 394 is connected between the base of transistor 391 and one end of motor 21. Motor drive control circuit 24 comprises a series circuit of switch 240 which is opened at the termination of a film winding operation, resistor 241 and thyristor 242, which series circuit is connected between the base of transistor 201 of motor drive circuit 20 and the negative terminal of battery 15. Resistor 243 is connected across the gate and the cathode of thyristor 242 while resistor 244 is connected between the gate of thyristor 242 and one end of switch 220. In FIG. 9, OR gate drive circuit 41 comprises transistor 411 having its emitter connected with the negative terminal of battery 15 and its base connected with one end of resistor 412 which has its other end connected with the junction between switch 220 and resistor 244. Switching circuit 17 comprises transistor 171 which has its emitter connected with the positive terminal of battery 15, and its collector connected with the base of oscillator transistor 182 in the power supply circuit 18. OR circuit 40 comprises resistor 401 connected between the collector of transistor 411 in the OR gate drive circuit 41 and the base of transistor 171 in switching circuit 17, and resistor 402 connected between the collector of transistor 391 of energization detector 39 and the base of transistor 171.

The operation of the circuit arrangements shown in FIGS. 8 and 9 is similar to that of the circuit arrangements shown in FIGS. 6 and 7. However, briefly describing the operation, transistor 201 in motor drive circuit 20 remains off after the termination of an automatic film winding operation to stop motor 21 and before the shutter is released. Then, there is a current flow from battery 15 through a series circuit comprising the emitter-base path of transistor 391, resistor 394 and motor 21, turning transistor 391 on. The magnitude of this current flow is limited by resistor 394 to be a small value, preventing motor 21 from being effectively energized. The conduction of transistor 391 renders transistor 171 off, whereby power supply circuit 18 is in its operative condition. Consequently, main capacitor 185 contained therein is charged in preparation to producing a flashlight illumination.

When the shutter of the camera is released under this condition, switch 240 is closed, conditioning the operation of thyristor 242. The termination of a shutter release operation causes switch 220 to be closed, producing a film winding signal. In response thereto, a firing voltage is applied across the gate of cathode of thyristor 242 from the d.c. source through switch 220 and resistor 244, thus turning thyristor 242 on. This in turn causes a base current of transistor 201 to flow through switch 240, resistor 241 and thyristor 242, thus turning transistor 201 on to permit an energization of motor 21 for rotation. The conduction of transistor 201 turns transistor 391 off, with consequence that the inhibit transistor 171 in switching circuit 17 is turned on to disable the operation of power supply circuit 18.

On the other hand, in the circuit arrangement of FIG. 9, the closure of switch 220 permits the voltage of d.c. source 15 to be applied across the base and the emitter of transistor 411 in OR gate drive circuit 41 through switch 220 and resistor 412, thus turning this transistor on. Consequently, transistor 171 of switching circuit 17 is immediately turned on to disable or inhibit the operation of power supply circuit 18 at a timing earlier than the inhibiting action provided by the operation of energization detector 39 in response to the closure of switch 220 which is transmitted through OR gate drive circuit 41.

Referring to FIGS. 8 and 9 again, when an automatic film winding operation by the motor drive is terminated as a result of rotation of motor 21, switch 220 is opened simultaneously with the opening of switch 240 which is designed to be opened at the termination of a film winding operation. Thus, transistor 201 is turned off to deenergize motor 21. In FIG. 9, the opening of switch 220 turns transistor 411 off, whereby transistor 171 of switching circuit 17 is no longer activated.

Referring to FIGS. 8 and 9 again, when motor 21 stops, this condition is detected by energization detector 39 in which transistor 391 resumes its conduction, turning transistor 171 off. Consequently, power supply circuit 18 is again rendered operative, initiating the charging of main capacitor 185.

In this manner, power supply circuit 18 associated with the electronic flash and motor 21 of the motor drive are alternately fed from common d.c. source 15 under the control of energization detector 39, assuring a reliable operation of motor 21 which constitutes the motor drive.

In the embodiment shown in FIGS. 2 to 4, time constant circuit 23 which is activated by generator 22 has been described as being formed by a capacitor and a resistor. However, it may be replaced by any other timing circuit such as a counter, a monostable multivibrator or delay circuit which produces a signal at a given timing.

What is claimed is:

1. Power supply apparatus for a camera, said power supply apparatus capable of being shared between a film winding motor drive for said camera and an electronic flash therefor, comprising:
   power source means for supplying energy for operating said motor drive and said electronic flash;
   means for selectively coupling energy from said power source means to said electronic flash;
   detecting means for detecting the operating state of said film winding motor drive and having a first state when said motor drive is operating and a second state when said motor drive is not operating;
   inhibiting means for inhibiting said means for selectively coupling energy to said electronic flash;
   means coupled to said detecting means and responsive to said first state for operating said inhibiting means;
   said inhibiting means including a switching circuit for inhibiting said means for selectively coupling energy to said electronic flash during the time interval that said film winding motor drive is activated;
   said detecting means additionally comprising detector circuit means coupled to said motor drive for detecting an activation of said film winding motor drive and for producing an energization detected signal in response thereto; and
   means responsive to said film winding control signal for inhibiting said means for selectively coupling energy to said electronic flash.

2. The power supply apparatus according to claim 1 additionally comprising signal generator means activated upon completion of a shutter release operation to generate said film winding control signal, said inhibiting means responding to said film winding control signal to inhibit said means for selectively coupling energy to said electronic flash.

3. The power supply apparatus according to claim 1 wherein said detector circuit means comprises transistor means having base, collector and emitter electrodes, and first, second, and third resistor means, said first resistor means being connected between a motor within said film winding motor drive and said base electrode of said transistor means, said second resistor means connected between said collector electrode and said power source means; and said third resistor means being connected between said base and emitter electrodes.

4. The power supply apparatus according to claim 1 wherein said means for receiving includes transistor oscillator means and said means responsive includes transistor switching means, each of said transistor means having base, emitter, and collector electrodes and said collector electrode of said transistor switching means being connected to said base electrode of said transistor oscillator means and said emitter electrode of said transistor switching means being connected to said emitter electrode of said transistor oscillator means.

5. The power supply apparatus according to claim 1 wherein said power source means comprises a d.c. source.

6. Power supply apparatus for a camera, said power supply apparatus capable of being shared between a film winding motor drive for said camera and an electronic flash therefor, comprising:
   power source means for supplying energy for operating said motor drive and said electronic flash;
   means for selectively coupling energy from said power source means to said electronic flash;
   detecting means for detecting the operating state of said film winding motor drive and having a first state when said motor drive is operating and a second state when said motor drive is not operating;
   inhibiting means for inhibiting said means for selectively coupling energy from said power source to said electronic flash;
   coupled to said detecting means and responsive to said first state for operating said inhibiting means;
   said inhibiting means including a switching circuit for inhibiting said means for selectively coupling energy to said electronic flash during the time interval that said film winding motor drive is activated;

said detecting means detecting that said film winding motor drive is deactivated and, in response thereto, said inhibiting means discontinuing the inhibiting of said means for selectively coupling energy to said electronic flash so that energy is supplied to said electronic flash.

7. The power supply apparatus according to claim 6 wherein said detecting means additionally comprises:
detector circuit means coupled to said motor drive for detecting an activation of said film winding motor drive and for producing an energization detected signal in response thereto; and
means responsive to said film winding control signal for inhhibiting said means for selectively coupling energy to said electronic flash.

8. The power supply apparatus according to claim 6 additionally comprising signal generator means activated upon completion of a shutter release operation to generate said film winding control signal, said inhibiting means responding to said film winding control signal to inhibit said means for selectively coupling energy to said electronic flash.

9. The power supply apparatus according to claim 6 wherein said detector circuit means comprises transistor means having base, collector and emitter electrodes, and first, second, and third resistor means, said first resistor means being connected between a motor within said film winding motor drive and said base electrode of said transistor means, said second resistor mesans connected between said collector electrode and said power source means; and said third resistor means being connected between said base and emitter electrodes.

10. The power supply apparatus according to claim 6 wherein said means for receiving includes transistor oscillator means and said means responsive includes transistor switching means, each of said transistor means having base, emitter, and collector electrodes and said collector electrode of said transistor switching means being connected to said base electrode of said transistor oscillator means and said emitter electrode of said transistor switching means being connected to said emitter electrode of said transistor oscillator means.

11. The power supply apparatus according to claim 6 wherein said power source means comprises a d.c. source.

* * * * *

UNITED STATES PATENT AND TRADEMARK OFFICE
CERTIFICATE OF CORRECTION

PATENT NO. : 4,426,144
DATED : January 17, 1984
INVENTOR(S) : Kawazoe

It is certified that error appears in the above—identified patent and that said Letters Patent is hereby corrected as shown below:

Column 1:

Line 20, after "eliminate" insert --the--;

Line 22, after "unit" insert --apparatus capable of being--;

Line 27, after "provided" insert --power supply apparatus having--;

Line 32, after "Either" insert --the--;

Line 37, before "without" insert --successfully shared therebetween;

Line 37, after "without" insert --an--; and change "a" to --periodic--;

Column 2:

Line 38, after "voltage" insert --input--;

UNITED STATES PATENT AND TRADEMARK OFFICE
CERTIFICATE OF CORRECTION

PATENT NO. : 4,426,144

DATED : January 17, 1984

INVENTOR(S) : Kawazoe

It is certified that error appears in the above—identified patent and that said Letters Patent is hereby corrected as shown below:

(column 2)

Line 48, after "whereby" insert --the--;

Line 53, after "completed" insert --signal--;

Line 57, after "signal" insert --which is--;

Line 64, after "signal" insert --from the signal generator 22--

Line 67, change "for" to --into--.

Column 3:

Line 3, change "given" to --selected--;

Line 6, change "and" to --while--;

Line 8, change "is" to --received--;

Line 9, change "ciently driven" to --cient power--;

Line 12, change "to a" to --in--; and after "length" insert --to the interval--;

UNITED STATES PATENT AND TRADEMARK OFFICE
CERTIFICATE OF CORRECTION

PATENT NO. : 4,426,144

DATED : January 17, 1984

INVENTOR(S) : Kawazoe

It is certified that error appears in the above—identified patent and that said Letters Patent is hereby corrected as shown below:

(column 3)

Line 22, change "to" to --for--;

Line 51, change "connected in shunt with" to --shunted across--;

Line 55, change "with" to --to--;

Line 57, after "15" insert --and its base connected to the time constant circuit 23--.

Column 4:

Line 16, change "Hence" to --Under these conditions--;

Line 21, change "across" to --to the--;

Line 24, after "is" insert --then--;

Line 25, change "is" to --has not--;

Line 43, change "signal" to --since--;

UNITED STATES PATENT AND TRADEMARK OFFICE
CERTIFICATE OF CORRECTION

PATENT NO. : 4,426,144

DATED : January 17, 1984

INVENTOR(S) : Kawazoe

It is certified that error appears in the above—identified patent and that said Letters Patent is hereby corrected as shown below:

(column 4)

Line 53, change "operation" to --performed--;

Line 56, after "chosen" insert --to be--;

Line 57, change "a length of time" to --the time interval--;

Line 61, after "again" insert --to continue the--; and after "charging" insert --of the--;

Line 61, delete "again" (second occurrence);

Line 62-63, delete "which constitutes";

Line 63 before "the" insert --for--;

Line 63-64, delete "motor 21 which constitutes";

Line 67, change "likelihood" to --possibility--;

Line 68, after "properly" insert --, due to overloading--.

UNITED STATES PATENT AND TRADEMARK OFFICE
CERTIFICATE OF CORRECTION

PATENT NO. : 4,426,144
DATED : January 17, 1984
INVENTOR(S) : Kawazoe

It is certified that error appears in the above—identified patent and that said Letters Patent is hereby corrected as shown below:

Column 5:

Line 9, change "is" to --are--;

Line 34, change "Then" to --In response to this signal, voltage from battery 15 is applied to--;

Line 35, delete "is fed from battery 15, thus charging"; and before "capacitor" insert --so that--;

Line 35, after "231" insert --begins charging--;

Line 39, change "This" to --In this condition--;

Line 41, after "is" insert --also--;

Line 47, after "completed," insert --as measured by the time constant circuit 23. The--.

Column 6:

Line 35, after "except" insert --for--;

UNITED STATES PATENT AND TRADEMARK OFFICE
CERTIFICATE OF CORRECTION

PATENT NO. : 4,426,144
DATED : January 17, 1984
INVENTOR(S) : Kawazoe

It is certified that error appears in the above—identified patent and that said Letters Patent is hereby corrected as shown below:

(column 6)

Line 41, after "18" insert --, which is--;

Line 48, change "20" (second occurrence) to --21--;

Line 54, change "differs between" to --distinguishes--;

Line 58, change "circuit" to --gate--;

Line 59, change "thence" to --therefrom--;

Line 64, change "20" to --21--.

Column 7:

Line 2, change "circuit" to --gate--;

Line 13, change "circuit" to --gate--;

Line 30, change "circuit" to --gate--;

Line 32, after "(In" insert --Fig. 6, while in--;

Line 34, after "17" insert --thus";

UNITED STATES PATENT AND TRADEMARK OFFICE
CERTIFICATE OF CORRECTION

PATENT NO. : 4,426,144
DATED : January 17, 1984
INVENTOR(S) : Kawazoe

It is certified that error appears in the above—identified patent and that said Letters Patent is hereby corrected as shown below:

(column 7)

Line 39, delete "to be";

Line 48, after "interval" insert --measured--;

Line 56, after "motor" insert --21--;

Line 65-66 delete "which constitutes";

Line 66, before "the" insert --for--;

Lines 66-67, delete "motor 21 which constitutes"; and after "drive" insert --20 for the motor 21--.

Column 8:

Line 42, change "circuit" to --gate--;

Line 53, change "21 and be" to --21.--;

Line 54, change "fore" to --Thus, prior to--; and change "released. Then" to --release,--;

Line 67, after "242" insert --for operation--.

UNITED STATES PATENT AND TRADEMARK OFFICE
CERTIFICATE OF CORRECTION

PATENT NO. : 4,426,144

DATED : January 17, 1984

INVENTOR(S) : Kawazoe

It is certified that error appears in the above—identified patent and that said Letters Patent is hereby corrected as shown below:

Column 9:

Line 9, change "with consequence that" to --turning--;

Line 10, delete "is turned";

Line 19, change "a timing" to --time--;

Line 41, change "fed" to --energized--;

Lines 50-51, change "at a given time." to --having a predetermined timing.--.

\* \* \*

Signed and Sealed this

Twenty-second Day of May 1984

[SEAL]

Attest:

GERALD J. MOSSINGHOFF

Attesting Officer     Commissioner of Patents and Trademarks